United States Patent

Gubler et al.

[15] 3,692,909
[45] Sept. 19, 1972

[54] METHODS OF COMBATTING FUNGI USING 6-ALKYLTHIO AND 6-PHENYL-THIO PYRIMIDINE DERIVATIVES

[72] Inventors: Kurt Gubler, Riehen; Raphael Menasse; Karl Gatzi, both of Basel, all of Switzerland

[73] Assignee: Ciba-Geigy Corporation, Ardsley, N.Y.

[22] Filed: Feb. 25, 1970

[21] Appl. No.: 14,233

Related U.S. Application Data

[63] Continuation-in-part of Ser. No. 749,598, Aug. 2, 1968, abandoned.

[30] Foreign Application Priority Data

Aug. 16, 1967 Switzerland..............11515/67

[52] U.S. Cl...............................424/251, 260/251 R
[51] Int. Cl. ..........................A01n 9/12, A01n 9/22
[58] Field of Search....................424/251; 260/251 R

[56] References Cited

UNITED STATES PATENTS 3,169,848  2/1965  Gysin et al....................71/2.5

OTHER PUBLICATIONS

Matsumoto et al., Chem. Abs., Vol. 61, 6300h, 1964.
Protsenko et al., Chem. Abs., Vol. 65, 3869f, 1966.
Roth et al., Chem. Abs., Vol. 55, 27349g, 1961.

Primary Examiner—Albert T. Meyers
Assistant Examiner—Allen J. Robinson
Attorney—Karl F. Jorda and Frederick H. Rabin

[57] ABSTRACT

Antifungal compositions are disclosed which contain as active ingredients 6-alkylthio- and 6-phenylthio-pyrimidines substituted in 2- and 5-position by halogen and in 4-position by halogen or lower alkyl. Methods for controlling fungi with the acid of the aforesaid pyrimidine derivatives are also described.

4 Claims, No Drawings

METHODS OF COMBATTING FUNGI USING 6-ALKYLTHIO AND 6-PHENYL-THIO PYRIMIDINE DERIVATIVES

CROSS-REFERENCE TO RELATED APPLICATION

This application is a continuation-in-part of our application, Ser. No. 749,598, filed Aug. 2, 1968, now abandoned.

DESCRIPTION OF THE INVENTION

The present invention relates to antifungal compositions, particularly for the control of phytopathogenic fungal growth on plants, which compositions contain pyrimidine derivatives as active substances, it also concerns a method for controlling phytopatogenic fungi with the aid of such pyrimidine derivatives.

2,4-Dichloro-6-methoxy-pyrimidine and other 2,4,6-substituted pyrimidines have become known as antifungally active substances from Japanese Patent Publication 11148/63 (Chem. Abstracts 61, 6300 h).

The invention provides compositions which contain as antifungally active substances pyrimidine derivatives of the general Formula I

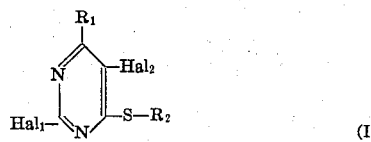

(I)

wherein $Hal_1$ and $Hal_2$ independently of each other each represent chlorine or bromine, $R_1$ represents chlorine, bromine or a lower alkyl radical, $R_2$ represents an alkyl radical, or a phenyl radical unsubstituted or substituted by chlorine and/or by lower alkyl.

Of particularly good antifungal activity are those compounds of Formula I in which $R_2$ represents a phenyl radical as defined above.

In the general formula I, by a lower alkyl radical $R_1$, one containing one to five carbon atoms, preferably the methyl radical is to be understood. Such a radical having one to 16 carbon atoms which can be straight or branch chained can be used as alkyl radical $R_2$; preferred is a lower alkyl radical having one to four carbon atoms.

The new pyrimidine derivatives are produced by reacting a halogenated pyrimidine derivative of the general Formula II

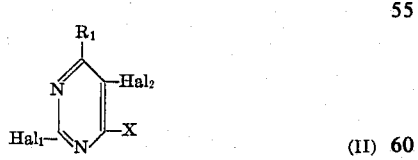

(II)

with a mercaptan of the general formula III $$R_2 - S - H$$ (III)

in which formulas

X represents chlorine or bromine, and $Hal_1$, $Hal_2$, $R_1$ and $R_2$ have the meanings given in Formula I.

The reaction is performed in the presence of an inorganic or organic base; optionally the mercaptan of Formula III is used in the form of its alkali or alkaline earth metal salt.

The reaction is advantageously performed in the presence of a solvent or diluent which is inert to the reaction partners. Hydrocarbons, halogenated hydrocarbons, amides, ethers and ether-type compounds alcohols, water etc. are used as such. Examples or inorganic bases are alkali and alkaline earth metal hydroxides and carbonates, and examples or organic bases are tertiary amines.

The new pyrimidine derivatives of general formula I have an excellent action against numerous phytopathogenic fungi. The new active substances are effective against fungi causing plant diseases, e.g. against powdery mildews such as powdery mildew of cucumbers (Erysiphe chichoracearum) and powdery mildew of roses (Sphaerotheca pannosa); downy mildews such as those which cause late blight of potatoes (Phytophthora infestans); leaf spot pathogens such as Alternaria solani; rusts such as bean rust (Uromyces app.), also against grey mould (Botrytis cinerea) which is particularly difficult to control. By using the agents according to the invention it is possible to control or reduce fungal growth on plants and parts thereof (fruit, blossom, foliage, stems) and on the parts of plants growing after treatment, particularly because the pyrimidine derivatives of general formula I can also act as systemic antifungal agents. The new substances are well tolerated by the plants treated therewith in amounts necessary for effective fungus control.

In addition, the agents according to the invention can be used for the treatment of seeds and of the soil.

The antifungal activity of the pyrimidine derivatives usable according to the invention was determined by the following tests:

Action against Alternaria solani on tomatoes (Solanum lycopersicum)

After three to four weeks' growth in a greenhouse, tomatoes of the "Lukullus" type are sprayed dripping wet with the substance to be tested in the form of a spray suspension (concentration 0.1 percent active substances) and, after the spray coating has dried, they are infected with a standardized spore suspension of the fungi. After being kept for about 5 days in a moist atmosphere at about 22° C, small black lesions develop on the leaves. The test is rated according to the number of lesions.

In the following table:

10 = inactive, infestation equally as strong as on untreated control plants

9–1 = decreasing infestation according to linear evaluation

0 = no infestation.

Alternaria solani

| active substance | degree of infestation |
|---|---|
| 2,5-dichloro-4-methyl-6-ethylthio-pyridimine | 4 |
| 2,5-dichloro-4-methyl-6-(4'-chlorophenylthio)- pyrimidine | 3 |
| 2,4,5-trichloro-6-(2',5'-dichlorophenylthiol)-pyrimidine | 4 |
| 2,4-dichloro-6-methoxy-pyrimidine (known from Japanese pat. publication 11,148/63, C.A. 61, 6300 h) | 10 |

Action against Botrytis cinerea on Vicia faba (broad beans)

Three well developed, equal sized leaves of Vicia faba which have been sprayed dripping wet with a suspension produced from the active substance in the form of a wettable powder (0.1 percent content of active substance) are laid in petri dishes which have been lined with moistened filter paper. After the spray coating has dried, the leaves are infected with a freshly prepared spore suspension of the fungi. After the leaves have been kept for 1 – 2 days in a moist atmosphere at 18°–20 C, black lesions, which at first are tiny spots but which quickly spread, are formed on the leaves. The activity of the substance being tested is rated according to the number and size of the lesions.

In the following table:
10 = inactive, infestation equally as strong as on untreated control plants,
9 – 1 = decreasing infestation according to linear evaluation
0 = no infestation.

Botrytis cinerea

| active substance | degree of infestation |
| --- | --- |
| 2,5-dichloro-4-methyl-6-(4'-chlorophenylthio)-pyrimidine | 5 |
| 2,4,5-trichloro-6-(2',5'-dichlorophenylthio)-pyrimidine | 3 |
| 2,4-dichloro-6-methoxy-pyrimidine (loc.cit.) | 10 |

Action against Erysiphe cichoracearum (powdery mildew of cucumbers) on cucumbers (Cucumis sativus)

Young cucumber plants are sprayed dripping wet with a 0.1 percent suspension of the active substances in the form of wettable powders and, after the spray coating has dried, they are sprayed with a spore suspension of powdery mildew of cucumbers. The plants are then placed in a greenhouse at about 23° C. After 8 days, the degree of attack (area of leaf surface covered by the Mycelium) on the infested and treated leaves is determined by comparison with untreated, infested controls.

In the following table:
10 = inactive, infestation equally as strong as on untreated control plants
9 – 1 = decreasing infestation according to linear evaluation
0 = no infestation.

Erysiphe cichoracearum

| active substance | degree of infestation |
| --- | --- |
| 2,5-dichloro-4-methyl-6-(4'-chlorophenylthio)-pyrimidine | 0 |
| 2,4,5-trichloro-6-(2',5'-dichlorophenylthio)-pyrimidine | 6 |
| 2,4-dichloro-6-methoxy-pyrimidine (loc.cit.) | 10 |

The following examples describe the production of the new compounds of general Formula I. The temperatures are in degrees Centigrade, and parts are given as parts by weight and are related to parts by volume as grams to milliliters.

EXAMPLE 1 a. 22 parts of tetrachloropyrimidine are dissolved in 200 parts by volume of benzene and 18 parts of 2,5-dichlorothiopenol are added. After the addition of 10 parts of sodium bicarbonate, the mixture is kept for 4 hours at a bath temperature of 100° while stirring and then cooled to room temperature. The precipitated sodium chloride is filtered off and the benzene is distilled off. After recrystallization from iso-propanol, the residue, 2,4,5-trichloro-6-(2',5'-dichlorophenylthio)-pyrimidine, melts at 125°–128°.

b. Twenty-two parts of tetrachloropyrimidine are added to 18 parts of 2,5-dichlorothiophenol dissolved in 100 parts by volume of 1N aqueous sodium hydroxide solution and the whole is heated for 2 hours at 75° while stirring. After cooling, the precipitate formed is filtered off under suction, washed with cold water, dried and recrystallized from iso-propanol. In this way, 2,4,5-trichloro-6-(2', 5'-dichlorophenylthio)-pyrimidine is obtained, M.P. 127°–129°.

EXAMPLE 2

14.7 parts of 4-methyl-thiophenyl sodium salt are dissolved in 200 parts by volume of methanol and a solution of 19.8 parts of 2,5,6-trichloro-4-methyl-pyrimidine in 50 parts by volume of methanol is added dropwise. The reaction mixture is stirred overnight at 20°. The sodium chloride which precipitates is filtered off, and 250 parts by volume of water are added to the filtrate. The 2,5-dichloro-4-methyl-6-(4'-methylphenylthio)-pyrimidine precipitates and, after recrystallization from ethanol, melts at 111°–113°.

The pyrimidine derivatives listed in the following table are obtained in the way described in the examples.

| No. | compound | boiling point: [B.P.] melting point: [M.P.] |
| --- | --- | --- |
| 1 | 2,5-dichloro-4-methyl-6-phenyl-thio-pyrimidine | M.P. 105–106° |
| 2 | 2,5-dichloro-4-methyl-6-(4'-chlorophenylthio)-pyrimidine | M.P. 130–131° |
| 3 | 2,5-dichloro-4-methyl-6-(2',5'-dichlorophenylthio)-pyrimidine | M.P. 142–146° |
| 4 | 2,5-dichloro-4-methyl-6-iso propylthio-pyrimidine | B.P. 101–104° /0.3 Torr |
| 5 | 2,4,5-trichloro-6-n-octylthio-pyrimidine | M.P. 10–12° |
| 6 | 2,5-dichloro-4-methyl-6-ethyl-thio-pyrimidine | B.P. 95–100° /0.5 Torr |
| 7 | 2,4,5-trichloro-6-methylthio-pyrimidine | M.P. 105–106° |
| 8 | 2,4,5-trichloro-6-dodecylthio-pyrimidine | M.P. 42–43° |
| 9 | 2,4,5-trichloro-6-hexadecyl-thio-pyrimidine | |
| 10 | 2,4,5-trichloro-6-(4'-methyl-3-chlorophenylthio)-pyrimidine | M.P. 130–131° |
| 11 | 3-chlorophenylthio)-pyrimidine | |

For use in plant protection, the active substances are incorporated in the usual way into distributing agents and/or carriers and so used that the concentration of active substance is in the range of 0.01 to 2 percent calculated on the total weight of the composition.

The antifungal compositions according to the invention are produced by intimately mixing and milling the active substances of general formula I with suitable carriers, optionally with the addition of dispersing agents or solvents which are inert to the active substances. The new active substances can be used in form of dusts, sprinkling agents, granulates such as coated granules, impregnated granules, homogeneous granules, wettable powders, pastes, emulsions, solutions or aerosols.

To produce the solid forms for use (dusts, sprinkling agents, granulates), the active substances are mixed with solid carriers. Examples of carriers are kaolin, talcum, bole, loess, chalk, limestone, ground limestone, ataclay, dolomite, diatomaceous earth, precipitated silicic acid, alkaline earth silicates, sodium and potassium aluminum silicates (feldspar and mica), calcium and magnesium sulphate, magnesium oxide, milled synthetic plastics, fertilizers such as ammonium sulphate, ammonium nitrate, urea, ground vegetable products such as bran, bark dust, sawdust, ground nutshells, cellulose powder, residues of plant extractions, active charcoal, etc. These carriers can be used alone or admixed with each other.

The particle size of the carriers is, for dusts advantageously up to about 0.1 mm, for sprinkling agents from about 0.075 – 0.2 mm and for granulates from 0.2 mm or more.

As a general rule, the concentrations of active substance in the solid preparations are from 0.5 – 80 percent calculated on the total weight of the preparation.

To these mixtures can also be added additives which stabilize the active substance and/or non-ionic, anionically and cationally active substances which, for example, improve the adhesion of the active substances on plants and parts thereof (glues and adhesives) and/or attain better wettability (wetting agents) and dispersibility (dispersing agents) of the active substances. The following are examples of adhesives: olein-chalk mixture, cellulose derivatives (methyl cellulose, carboxymethyl cellulose, hydroxyethyl cellulose); the following substances can serve e.g. as wetting and dispersing agents: poly-ethylene glycol ethers of mono- and di-alkylphenols having 5 – 15 ethylene oxide radicals per molecule and 8 – 9 carbon atoms in the alkyl radical, lignin sulphonic acids, the alkali and alkaline earth salts thereof, polyethylene glycol ethers (carbo-waxes), fatty alcohol polyethylene glycol ethers having 5 – 20 ethylene oxide radicals per molecule and eight – 18 carbon atoms in the fatty alcohol part, condensation products of ethylene oxide/propylene oxide, polyvinyl pyrrolidones, polyvinyl alcohols, condensation products of urea/formaldehyde, as well as Latex products.

The concentrates of active substance which can be dispersed in water, i.e. wettable powders, pastes and emulsion concentrates, are agents which can be diluted with water to any concentration desired. They consist of active substance, carrier, optionally additives which stabilize the active substance, surface active substances, and anti-foam agents and, optionally, solvents. The concentration of active substance in these agents is 5 – 80 percent calculated on the total weight of the agent.

Wettable powders and pastes are obtained by mixing and milling the active substances with dispersing agents and pulverulent carriers (n suitable apparatus until homogeneity is attained. Carriers are, for example, those mentioned in the paragraph dealing with solid forms for application. In some cases it is advantageous to use mixtures of different carriers. The following can be used e.g. as dispersing agents: condensation products of sulphonated naphthalene and sulphonated naphthalene derivatives with formaldehyde, condensation products of naphthalene or naphthalene sulphonic acids with phenol and formaldehyde, also alkali, ammonium and alkaline earth salts of lignin sulphonic acid, also alkyl aryl sulphonates, alkali and alkaline earth salts of dibutyl naphthalene sulphonic acid, fatty alcohol sulphates such as salts of sulphated hexadecanols, heptadecanols, octadecanols, octadecenols and salts of sulphated fatty alcohol polyglycol ethers, the sodium salt of oleoyl ethionate, the sodium salt of oleoyl methyl tauride, ditertiary acetylene glycols, dialkyl dilauryl ammonium chloride and fatty acid alkali and alkaline earth salts.

Silicones, as "Antifoam A" (a finely divided emulsified silicone manufactured by the Dow Chemical Company) are used, for example, as anti-foam agents. The active substances are so mixed, milled, sieved and strained with the additives mentioned above that the solid particle size in wettable powders of 0.02 – 0.04 mm and, in pastes of 0.003 mm is not exceeded. To produce emulsion concentrates and pastes, dispersing agents such as those given in the previous paragraphs, organic solvents and water are used. Examples of solvents are as follows: alcohols, benzenes, xylenes, toluene, dimethyl sulphoxide and mineral oil fractions boiling between 120 and 350°C. The solvents must be odorless, not phytotoxic, inert to the active substances and not easily inflammable.

In addition, the compositions according to the invention can be applied in the form of solutions. For this purpose, the active substance or several active substances of general formula I are dissolved in suitable organic solvents, mixtures of solvents or in water. Aliphatic and aromatic hydrocarbons, chlorinated derivatives thereof, alkyl naphthalenes, alone or mixed with each other can be used as organic solvents. The solutions should contain the active substances in a concentration from 1 – 20 percent.

Other biocidally active compounds or agents can be mixed with the compositions according to the invention described. Thus, to broaden the range of action, the new compositions can contain, in addition to the compounds mentioned of general formula I, e.g. insecticides, other fungicides, bactericides, fungistatics, bacteriostatics or nematocides. The compositions according to the invention can also contained fertilizers, trace elements, etc.

The following forms for application of the compositions according to the invention serve to illustrate the invention further. Where not otherwise expressly stated, "parts" mean parts by weight.

Wettable Powder

The following substances are used to product, a) a 10 percent, b) a 20 percent and c) a 40 percent wettable powder:

a. 10 parts of 2,4,5-trichloro-6-(2',5'-dichlorophenylthio)-pyrimidine
   25 parts of sodium aluminum silicate
   30 parts of Champagne chalk (a very finely divided calcium carbonate, supplied by the French farm Omya)
   10 parts of lignin sulphonic acid sodium salt 2 parts of nonylphenyl polyethylene glycol ether
2 parts of a 1:1 mixture of polyvinyl alcohol and Champagne chalk
21 parts of kaolin b. 20 parts of 2,5-dichloro-4-methyl-6-(4'-methylphenylthio)-pyrimidine
10 parts of kieselguhr
30 parts of Champagne chalk (a very finely divided calcium carbonate, supplied by the French farm Omya)
4 parts of N-methyl-N-oleoyl tauride sodium salt
6 parts of naphthalene sulphonic acids/phenol sulphonic acids/formaldehyde condensate [3:2:0.5]
30 parts of kaolin c. 40 parts of 2,5-dichloro-4-methyl-6-(4'-chlorophenylthio)-pyrimidine
10 parts of lignin sulphonic acid sodium salt
20 parts of sodium aluminum silicate
2 parts of dibutyl-naphthalene sulphonic acid sodium salt
2 parts of a 1:1 mixture of polyvinyl alcohol and kaolin
11 parts of Champagne chalk (a very finely divided calcium carbonate, supplied by the French firm Omya)
15 parts of diatomaceous earth The carriers are coated with the active substances given and these are then mixed with the additives listed. Wettable powders having excellent wettability and suspendibility are obtained. Suspensions of any concentration of active substance desired can be obtained from such wettable powders by dilution with water. The suspensions serve for the treatment of cultivated plants.

Dust

The following substances are used to produce a 5 percent dust:
5 parts of 2,5-dichloro-4-methyl-6-phenylthio-pyrimidine
3 parts of sodium aluminum silicate
92 parts of talcum.

The active substance mentioned above is intimately mixed and milled with the carriers. The fungicidal dust so obtained serves for the treatment of earth in seed beds or for dusting plants.

Granulates

The following substances are used to produce a) a 2 percent and b) a 5 percent granulate:
a. 5 parts of the 40 percent wettable powder described above under c)
1 part of purified kieselguhr
90 parts of ground limestone (0.4 – 0.8 mm)
4 parts of polyethylene glycol
b. 5 parts of 2,5-dichloro-4-methyl-6-ethylthio-pyrimidine
1.5 parts of kieselguhr
0.5 parts of cetyl polyglycol ether
87 parts of ground limestone (0.4 – 0.8 mm)
5 parts of polyethylene glycol
1 part of silicic acid.

The ground limestone is impregnated with the polyethylene glycol or with the glycol ether mentioned and then mixed with the 40 percent wettable powder or with the mixture of active substance and kieselguhr. Then kieselguhr or silicic acid is added as anti-caking agent. These granulates are particularly suitable for the treatment of bedding soil.

Emulsion Concentrate

The following substances are used to produce a 10 percent emulsion concentrate:
10 parts of 2,5-dichloro-4-methyl-6-(4'-chlorophenylthio)-pyrimidine
5 parts of chlorobenzene
10 parts of cyclohexanone
70 parts of petroleum distillate (boiling range 158°–159° C, 96 percent aromatic content)
5 parts of a combination of emulsifiers consisting of calcium dodecylbenzene sulfonate and nonylphenyl polyethylene glycol ether.

The active substance mentioned is dissolved in the mixture of the solvents mentioned and then the combination of emulsifier is added to this solution. An emulsion concentrate is obtained which can be diluted with water to form emulsions of any concentration desired. Such emulsions are suitable for the treatment of cultivated plants.

We claim:

1. A method for combating phytopathogenic fungi which comprises applying to a plant infested therewith a fungitoxic amount of a compound of the formula

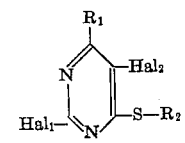

wherein each of $Hal_1$ and $Hal_2$ represents chlorine or bromine,
$R_1$ represents chlorine, bromine or methyl and
$R_2$ represents alkyl of from one to 16 carbon atoms, phenyl, 4'-chlorophenyl, 2', 5'-dichlorophenyl or 4'-methyl-3'-chlorophenyl.

2. The method according to claim 1 in which the compound is 2,5-dichloro-4-methyl-6-(4'-chlorophenylthio)-pyrimidine.

3. The method according to claim 1 in which the compound is 2, 4, 5,-tirchloro-6-(2', 5'-dichlorophenylthio)-pyrimidine.

4. The method according to claim 1 in which the compound is 2,5-dichloro-4-methyl-6-ethylthio-pyrimidine.

* * * * *